United States Patent
Jang et al.

(10) Patent No.: US 9,769,711 B2
(45) Date of Patent: Sep. 19, 2017

(54) METHOD AND APPARATUS FOR RESELECTING A CELL IN HETEROGENEOUS NETWORKS IN A WIRELESS COMMUNICATION SYSTEM

(71) Applicant: Samsung Electronics Co., Ltd., Suwon-si, Gyeonggi-do (KR)

(72) Inventors: Jae Hyuk Jang, Suwon-si (KR); Gert Jan Van Lieshout, Middlesex (GB); Kyeong In Jeong, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 201 days.

(21) Appl. No.: 14/347,824

(22) PCT Filed: Oct. 4, 2012

(86) PCT No.: PCT/KR2012/008038
§ 371 (c)(1),
(2) Date: Mar. 27, 2014

(87) PCT Pub. No.: WO2013/051858
PCT Pub. Date: Apr. 11, 2013

(65) Prior Publication Data
US 2014/0241324 A1    Aug. 28, 2014

Related U.S. Application Data

(60) Provisional application No. 61/543,475, filed on Oct. 5, 2011, provisional application No. 61/545,363, filed
(Continued)

(51) Int. Cl.
*H04W 36/00* (2009.01)
*H04W 48/12* (2009.01)
(Continued)

(52) U.S. Cl.
CPC ....... *H04W 36/0022* (2013.01); *H04W 48/12* (2013.01); *H04W 48/18* (2013.01); *H04W 84/045* (2013.01)

(58) Field of Classification Search
None
See application file for complete search history.

(56) References Cited

U.S. PATENT DOCUMENTS 8,270,374 B2 * 9/2012 Cai et al. ............... 370/332
8,942,630 B2    1/2015 Lee et al.
(Continued)

FOREIGN PATENT DOCUMENTS

CN    101553054 A    10/2009
CN    101841830 A    9/2010
(Continued)

OTHER PUBLICATIONS

Perez-Romero et al., RRM Algorithms, Radio Resource Management Strategies in UMTS, Jun. 17, 2005, pp. 177-301, John Wiley & Sons, Ltd, Chichester, UK, XP055044825.
(Continued)

*Primary Examiner* — Hassan Kizou
*Assistant Examiner* — Roberta A Shand
(74) *Attorney, Agent, or Firm* — Jefferson IP Law, LLP

(57) ABSTRACT

The present disclosure provides a method for cell reselection in a wireless communication system in which various radio access technologies (RATs) coexist with each other. In a wireless communication system in which heterogeneous networks coexist with each other, the method of cell reselection between heterogeneous networks for a user equipment may include: receiving a system information block (SIB) containing cell reselection parameters from a corresponding base station; checking whether cell reselection parameters based on a cell selection quality value (Squal)
(Continued)

are configured in the received SIB; and performing, when cell reselection parameter based on Squal are not configured, cell reselection based on a cell selection receive level value (Srxlev). The present disclosure may prevent the user equipment from performing unnecessary cell reselection.

10 Claims, 11 Drawing Sheets

Related U.S. Application Data on Oct. 10, 2011, provisional application No. 61/546,532, filed on Oct. 12, 2011, provisional application No. 61/553,359, filed on Oct. 31, 2011.

(51) Int. Cl.
 *H04W 84/04* (2009.01)
 *H04W 48/18* (2009.01)

(56) References Cited

U.S. PATENT DOCUMENTS

| | | | |
|---|---|---|---|
| 9,072,025 B2 | 6/2015 | Jen et al. | |
| 2004/0082328 A1 | 4/2004 | Japenga et al. | |
| 2005/0153692 A1* | 7/2005 | Hwang | H04W 48/12 455/434 |
| 2007/0054666 A1* | 3/2007 | Choi | H04W 60/00 455/434 |
| 2008/0107019 A1* | 5/2008 | Lee | H04W 36/06 370/229 |
| 2009/0274086 A1* | 11/2009 | Petrovic | H04J 11/0093 370/312 |
| 2010/0029283 A1 | 2/2010 | Iwamura | |
| 2010/0091702 A1 | 4/2010 | Luo et al. | |
| 2010/0197310 A1 | 8/2010 | Jung et al. | |
| 2011/0103328 A1 | 5/2011 | Lee et al. | |
| 2011/0105123 A1 | 5/2011 | Lee et al. | |
| 2011/0110251 A1* | 5/2011 | Krishnamurthy et al. | 370/252 |
| 2011/0110254 A1* | 5/2011 | Ji | H04W 36/0066 370/252 |
| 2011/0124334 A1 | 5/2011 | Brisebois et al. | |
| 2011/0164560 A1 | 7/2011 | Ki et al. | |
| 2011/0171967 A1 | 7/2011 | Lee et al. | |
| 2011/0183662 A1 | 7/2011 | Lee et al. | |
| 2011/0319076 A1* | 12/2011 | Ramasamy | H04W 48/16 455/434 |
| 2012/0135731 A1* | 5/2012 | Rangaiah | H04W 48/20 455/434 |
| 2012/0258718 A1* | 10/2012 | Whinnett et al. | 455/437 |
| 2012/0276933 A1* | 11/2012 | Laitinen | H04W 68/025 455/458 |
| 2013/0223235 A1* | 8/2013 | Hu et al. | 370/242 |
| 2014/0086208 A1* | 3/2014 | Murray et al. | 370/331 |
| 2014/0295851 A1* | 10/2014 | Kubota et al. | 455/441 |
| 2015/0079989 A1* | 3/2015 | Tambaram Kailasam et al. | 455/436 |
| 2015/0334636 A1 | 11/2015 | Maeda et al. | |

FOREIGN PATENT DOCUMENTS

| | | |
|---|---|---|
| CN | 102123520 A | 7/2011 |
| CN | 102204357 A | 9/2011 |
| JP | 2011-044822 A | 3/2011 |
| KR | 10-2010-0031544 A | 3/2010 |
| KR | 10-2010-0046492 A | 5/2010 |
| KR | 10-2011-0030051 A | 3/2011 |
| RU | 2009 121 539 A | 12/2010 |
| WO | 2005/122621 A1 | 12/2005 |
| WO | 2008/081816 A1 | 7/2008 |
| WO | 2008/137354 A1 | 11/2008 |
| WO | 2010/124228 A2 | 10/2010 |

OTHER PUBLICATIONS

3rd Generation Partnership Project; Technical Specification Group GSM/Edge Radio Access Network; Radio Subsystem Link Control (Release 1999), 3GPP TS 05.08, Nov. 1, 2005, pp. 1-100, V8.23.0, Sophia-Antipolis Cedex, France, XP050358959.

Nokia Corporation et al.; RACH and carrier aggregation; 3GPP TSG-RAN WG2 Meeting #68; R2-096844; Nov. 9-13, 2009; Jeju, South Korea.

Asustek; Issues of Random Access procedure on SCell; 3GPP TSG-RAN WG2 Meeting #74; R2-112922; May 9-13, 2011; Barcelona, Spain.

Itri; Considerations on Random Access on SCell; 3GPP TSG RAN WG2 #74; R2-113192; May 9-13, 2011; Barcelona, Spain.

LG Electronics Inc; Applicable Scope of PCL/PSC range of CSG cells; 3GPP TSG-RAN WG2 #75bis; R2-115448; Oct. 10-14, 2011; Zhuhai, China.

New Postcom; Consideration on RA response window size for SCell; 3GPP TSG RAN WG2 Meeting #79; R2-123485; Aug. 13-17, 2012; Qingdao, China.

* cited by examiner

METHOD AND APPARATUS FOR RESELECTING A CELL IN HETEROGENEOUS NETWORKS IN A WIRELESS COMMUNICATION SYSTEM

TECHNICAL FIELD

The present disclosure relates to a wireless communication system. More particularly, the present disclosure relates to a method for cell reselection in a system in which Long Term Evolution (LTE), Universal Mobile Telecommunications System (UMTS), Global System for Mobile Communications (GSM) and CDMA2000 coexist with each other.

BACKGROUND ART

Recent advances in wireless communication technologies have caused repeated evolution of communication systems technologies. As such, network operators have to manage networks in which GSM (second generation mobile communication), UMTS and CDMA2000 (third generation mobile communication), and LTE (fourth generation mobile communication) coexist with each other. This has necessitated mobility support between heterogeneous wireless communication technologies, wireless communication systems, or Radio Access Technologies (RATs).

FIG. 1 illustrates the architecture of the LTE system, to which the present disclosure is applied.

Referring to FIG. 1, the radio access network of the LTE system is composed of Evolved Node Bs (ENB, Node B or base station) 105, 110, 115 and 120, Mobility Management Entity (MME) 125, and Serving Gateway (S-GW) 130. A user equipment (UE or terminal) 135 may connect to an external network through the ENBs 105 to 120 and the S-GW 130.

In FIG. 1, the ENBs 105 to 120 correspond to Node Bs of the existing UMTS system. The ENB is connected to the UE 135 through a radio channel, and may perform more complex functions in comparison to the existing Node B. In the LTE system, as all user traffic including real-time services like Voice over IP (VoIP) services is served by shared channels, an entity is needed to perform scheduling on the basis of status information collected from UEs such as information on buffer states, available transmit power and channels. Each of the ENBs 105 to 120 performs this scheduling function. In most cases, a single ENB controls multiple cells. To achieve a data rate of 100 Mbps, the LTE system utilizes Orthogonal Frequency Division Multiplexing (OFDM) in, for example, a 20 MHz bandwidth as radio access technology. Adaptive modulation and coding (AMC) is employed to determine the modulation scheme and channel coding rate according to UE channel states. The S-GW 130 provides data bearers, and creates and releases a data bearer under control of the MME 125. The MME 125 performs various control functions including UE mobility management and is connected to multiple ENBs.

FIG. 2 illustrates a hierarchy of wireless protocols in the LTE system, to which the present disclosure is applied.

Referring to FIG. 2, for a UE and ENB in the LTE system, the wireless protocol stack is composed of Packet Data Convergence Protocol (PDCP) 205 or 240, Radio Link Control (RLC) 210 or 235, Medium Access Control (MAC) 215 or 230, and a physical layer (PHY) 220 or 225. The PDCP 205 or 240 performs compression and decompression of IP headers. The RLC 210 or 235 reconfigures PDCP PDUs (Protocol Data Unit) to a suitable size. The MAC 215 or 230 is connected to multiple RLC layer entities in the same UE, and multiplexes RLC PDUs into MAC PDUs or demultiplexes MAC PDUs into RLC PDUs. The physical layer 220 or 225 converts higher layer data into OFDM symbols by means of channel coding and modulation and transmits the OFDM symbols through a wireless channel, or converts OFDM symbols received through a wireless channel into higher layer data by means of demodulation and channel decoding and forwards the data to higher layers. For additional error correction, hybrid ARQ (HARQ) is used in the physical layer, and the receiving end sends 1-bit HARQ ACK/NACK information indicating whether a packet transmitted by the transmitting end is received. Downlink HARQ ACK/NACK information as to uplink transmission may be sent through Physical Hybrid-ARQ Indicator Channel (PHICH), and uplink HARQ ACK/NACK information as to downlink transmission may be sent through Physical Uplink Control Channel (PUCCH) or Physical Uplink Shared Channel (PUSCH).

Meanwhile, an LTE UE in the idle mode may perform cell reselection owing to movement or the like. For movement between cells of different (heterogeneous) RATs (e.g. GSM and UMTS), the LTE UE may use a cell selection receive level value (referred to as Srxlev) in a form of received signal strength indication and a cell selection quality value (referred to as Squal) in a form of received signal quality indication according to versions.

Srxlev and Squal are computed by Equation 1 given below.

$$Srxlev = Q_{rxlevmeas} - (Q_{rxlevmin} + Q_{rxlevminoffset}) - Pcompensation$$

$$Squal = Q_{qualmeas} - (Q_{qualmin} + Q_{qualminoffset}) \quad \text{[Equation 1]}$$

Here, $Q_{rxlevmeas}$ indicates measured received signal strength and $Q_{qualmeas}$ indicates measured received signal quality. $Q_{rxlevmin}$ indicates minimum power required for operation and $Q_{qualmin}$ indicates minimum quality required for operation. $Q_{rxlevminoffset}$ indicates power offset for base stations with a higher priority and $Q_{qualminoffset}$ indicates quality offset for base stations with a higher priority. Pcompensation indicates a correction parameter set for uplink transmission power of the UE.

The Srxlev value is computed based on Reference Signal Received Power (RSRP) in LTE and is computed based on Received Signal Code Power (RSCP) in UMTS. The Squal value is computed based on Reference Signal Received Quality (RSRQ) in LTE and is computed based on the value of Ec/No in UMTS (the received energy per chip (Ec) of the pilot channel divided by the total noise power density (No)).

When multiple RATs (e.g. GSM, UMTS and LTE) coexist with each other as described above, a UE may have to perform inter-RAT cell reselection. Here, as different RATs employ different communication schemes, the UE may have to use different cell reselection criteria. For example, for cell reselection, only Srxlev is used in GSM, CDMA2000, UMTS and the early LTE system (Release 8 or Rel-8). However, Srxlev and Squal may be used in the recent LTE system (from Release 9 or Rel-9).

This is described in more detail below in connection with the LTE system.

At inter-RAT cell reselection based on Srxlev in LTE Rel-8, when $S_{nonServingCell,x}$ of a cell on evaluated frequency is greater than $Thresh_{x,high}$ during a time interval $Treselection_{RAT}$, cell reselection to the cell is performed. Here, $S_{nonServingCell,x}$ is the Srxlev value of a cell being measured, and the values $Thresh_{x,high}$ and $Treselection_{RAT}$ are transmitted by the LTE base station through preset SIBs or the like.

For example, $Thresh_{x,high}$ and $Treselection_{RAT}$ values for UMTS are transmitted through SIB6; $Thresh_{x,high}$ and $Treselection_{RAT}$ values for GSM are transmitted through SIB7; and $Thresh_{x,high}$ and $Treselection_{RAT}$ values for CDMA2000 are transmitted through SIB8.

However, in LTE Rel-9 and later, cell reselection may be performed on the basis of Srxlev and Squal according to circumstances. That is, in LTE Rel-9 and later, when the threshServingLowQ value is provided through SIB3, cell reselection is performed based on Squal. Otherwise, cell reselection is performed based on Srxlev. Specifically, in the event that the threshServingLowQ value is provided through SIB3, cell reselection to a UMTS cell is performed when Squal is greater than $Thresh_{X,HighQ}$ during a time interval $Treselection_{RAT}$; and cell reselection to a GSM or CDMA2000 cell is performed when Srxlev is greater than $Thresh_{X,HighP}$ during a time interval $Treselection_{RAT}$. In the event that the threshServingLowQ value is not provided through SIB3, cell reselection to a UMTS, GSM or CDMA2000 cell is performed when Srxlev is greater than $Thresh_{X,HighP}$ during a time interval $Treselection_{RAT}$. $Treselection_{RAT}$, $Thresh_{X,HighQ}$ and $Thresh_{X,HighP}$ values are transmitted through preset SIBs. More specifically, $Treselection_{RAT}$, $Thresh_{X,HighQ}$ and $Thresh_{X,HighP}$ values for UMTS are transmitted through SIB6; $Treselection_{RAT}$ and $Thresh_{X,HighP}$ values for GSM are transmitted through SIB7; and $Treselection_{RAT}$ and $Thresh_{X,HighP}$ values for CDMA2000 are transmitted through SIB8.

Accordingly, up to LTE Rel-8, inter-RAT cell reselection may be performed solely on the basis of Srxlev. However, when a latest LTE system (LTE Rel-9 or later) coexists with existing 2G and 3G systems, the following problem may arise. That is, a UE may perform inter-RAT cell reselection based on Srxlev while remaining in a GSM, CDMA2000 or UMTS cell, and perform inter-RAT cell reselection based on Squal while remaining in an LTE cell. In this case, the UE in the LTE cell may perform Squal-based cell reselection to a UMTS cell owing to a low Squal value. Immediately thereafter, the UE in the UMTS cell may perform Srxlev-based cell reselection to an LTE cell owing to a low Srxlev value. Such a ping-pong effect should be resolved.

FIG. 3 illustrates a problem that may arise at cell reselection when multiple RATs coexist with each other.

In FIG. 3, the UE 301 capable of supporting LTE, UMTS and GSM communication remains in an LTE base station 303 at time T1. At operation 311, the UE supporting LTE Rel-9 performs Squal-based cell reselection to a UMTS cell. At operation 313, the UE remaining in the UMTS cell performs cell reselection to a GSM cell using a permitted measurement scheme. As the UE supports GSM Rel-6, the UE cannot perform Squal-based cell reselection in the GSM cell. At operation 315, the UE in the GSM cell performs Srxlev-based cell reselection back to the LTE cell. After returning to the LTE base station, at operation 317, the UE performs Squal-based cell reselection to the UMTS cell. At operation 319, the UE in the UMTS cell performs cell reselection to the GSM cell using a permitted measurement scheme. In this way, inter-RAT cell reselection using different schemes in different systems may cause a ping-pong effect.

DISCLOSURE OF INVENTION

Technical Problem

Aspects of the present disclosure are to address the above mentioned problems. Accordingly, an aspect of the present disclosure is to provide a method and apparatus for cell reselection that enable reselection of a cell suitable for communication without unnecessary cell reselection at inter-RAT cell reselection in a wireless mobile communication system in which heterogeneous networks coexist with each other.

Solution to Problem

In a wireless communication system in which heterogeneous networks coexist with each other, to enable reselection of a cell suitable for communication without unnecessary cell reselection, for a newest user equipment (Rel-9 or later), the present disclosure proposes a cell reselection method described below. For cell reselection by a user equipment (UE) remaining in an LTE cell, among system information blocks (SIBs) broadcast from the LTE cell, when Squal-based cell reselection parameters are configured in an SIB containing information on a RAT acting as a target for cell reselection (i.e. Squal measurement is configured for cell reselection to the target RAT), the UE performs cell reselection to the target RAT on the basis of Squal measurement results only if the version of the target RAT implemented internally to the UE is higher than or equal to the LTE version of the UE, and performs cell reselection based on Srxlev measurement results if otherwise;

the UE performs cell reselection to a target RAT for which Squal-based cell reselection parameters are configured on the basis of Squal measurement results only if the target RAT also supports Squal-based cell reselection, and performs cell reselection based on Srxlev measurement results if otherwise; and among SIBs broadcast from the LTE cell, when Squal-based cell reselection parameters are configured in a SIB containing information on a RAT acting as a target for cell reselection (i.e. Squal measurement is configured for cell reselection to the target RAT), the UE performs cell reselection to the target RAT for which Squal-based cell reselection parameters are configured on the basis of Squal measurement results only if inter-RAT cell reselection based on Squal is supported by all neighboring RATs that are signaled through SIBs and supported by the UE, and performs cell reselection based on Srxlev measurement results if otherwise.

In accordance with an aspect of the present disclosure, a method for a user equipment (UE) to conduct cell reselection between heterogeneous networks in a wireless communication system in which heterogeneous networks coexist with each other is provided. The cell reselection method may include: receiving a system information block (SIB) containing cell reselection parameters from a corresponding base station; checking whether cell reselection parameters based on a cell selection quality value (Squal) are configured in the received SIB; and performing, when cell reselection parameter based on Squal are not configured, cell reselection based on a cell selection receive level value (Srxlev).

In accordance with another aspect of the present disclosure, a user equipment capable of conducting cell reselection between heterogeneous networks in a wireless communication system in which heterogeneous networks coexist with each other is provided. The user equipment may include: a transceiver unit to send and receive signals to and from a base station; and a control unit to control a process of receiving a system information block (SIB) containing cell reselection parameters from a corresponding base station, checking whether cell reselection parameters based on a cell selection quality value (Squal) are configured in the received SIB, and performing, when cell reselection parameter based on Squal are not configured, cell reselection based on a cell selection receive level value (Srxlev).

Advantageous Effects of Invention

In a feature of the present disclosure, use of the proposed method enables sensible reselection of a cell without unnecessary cell reselection in a network wherein heterogeneous radio access technologies coexist with each other.

MODE FOR THE INVENTION

Hereinafter, embodiments of the present disclosure are described with reference to the accompanying drawings. Detailed descriptions of well-known functions and structures incorporated herein may be omitted to avoid obscuring the subject matter of the present disclosure.

The present disclosure relates to inter-RAT cell reselection for a user equipment in the LTE system.

Figure 1:
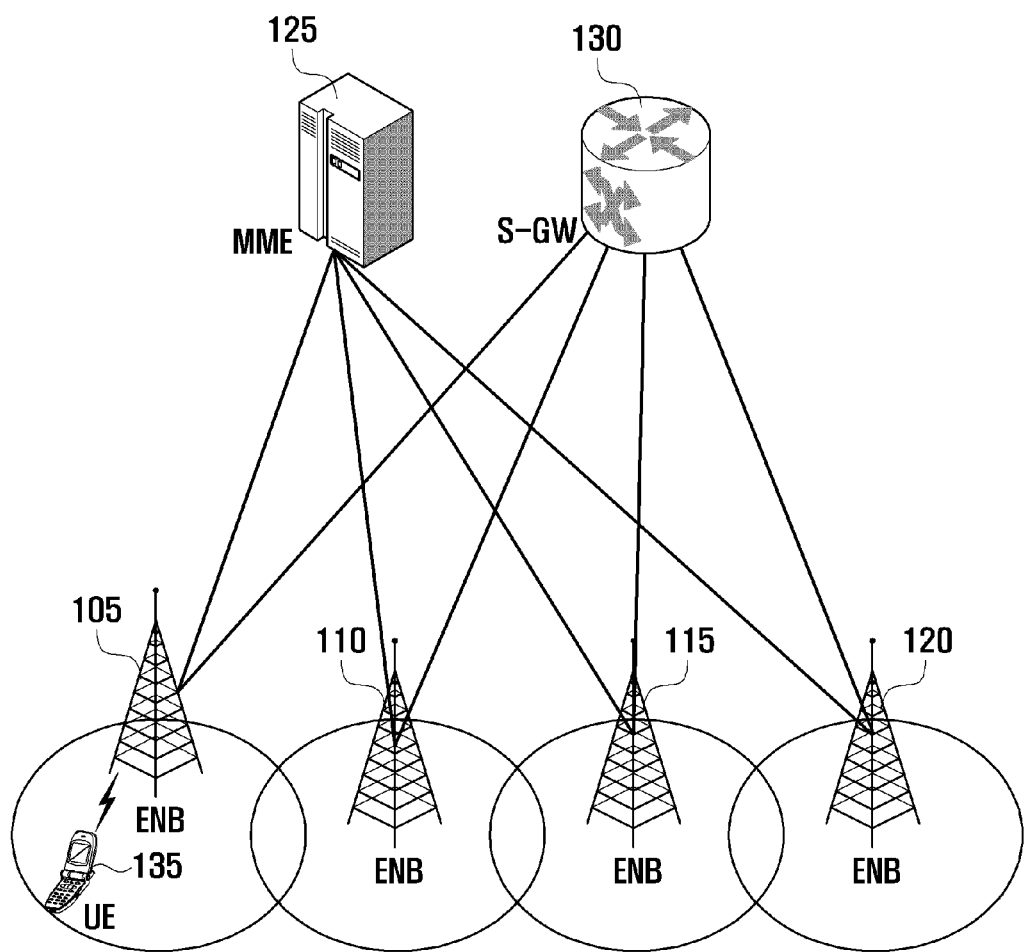
FIG. 1 illustrates the architecture of the LTE system, to which the present disclosure is applied.
Figure 2:
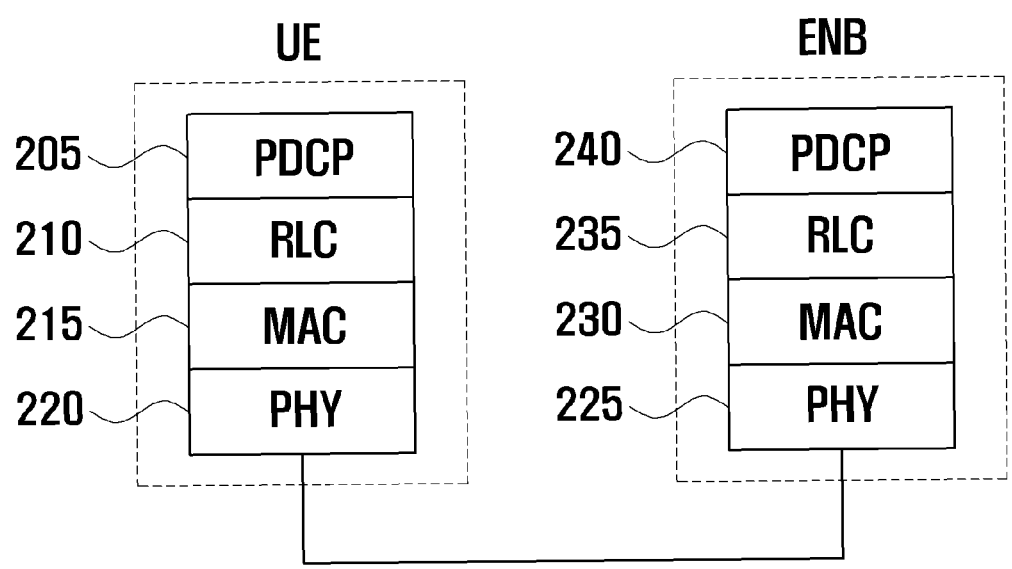
FIG. 2 illustrates a hierarchy of wireless protocols in the LTE system, to which the present disclosure is applied.
Figure 3:
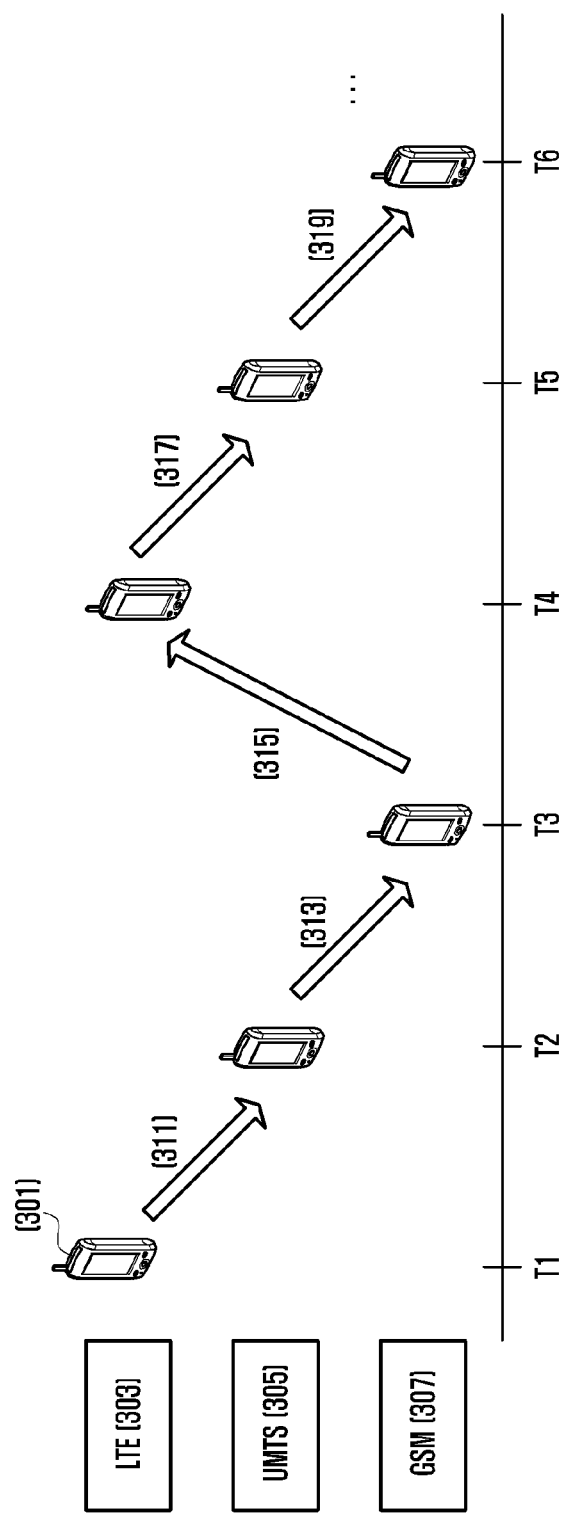
FIG. 3 illustrates a problem that may arise at cell reselection when multiple RATs coexist with each other.
Figure 4:
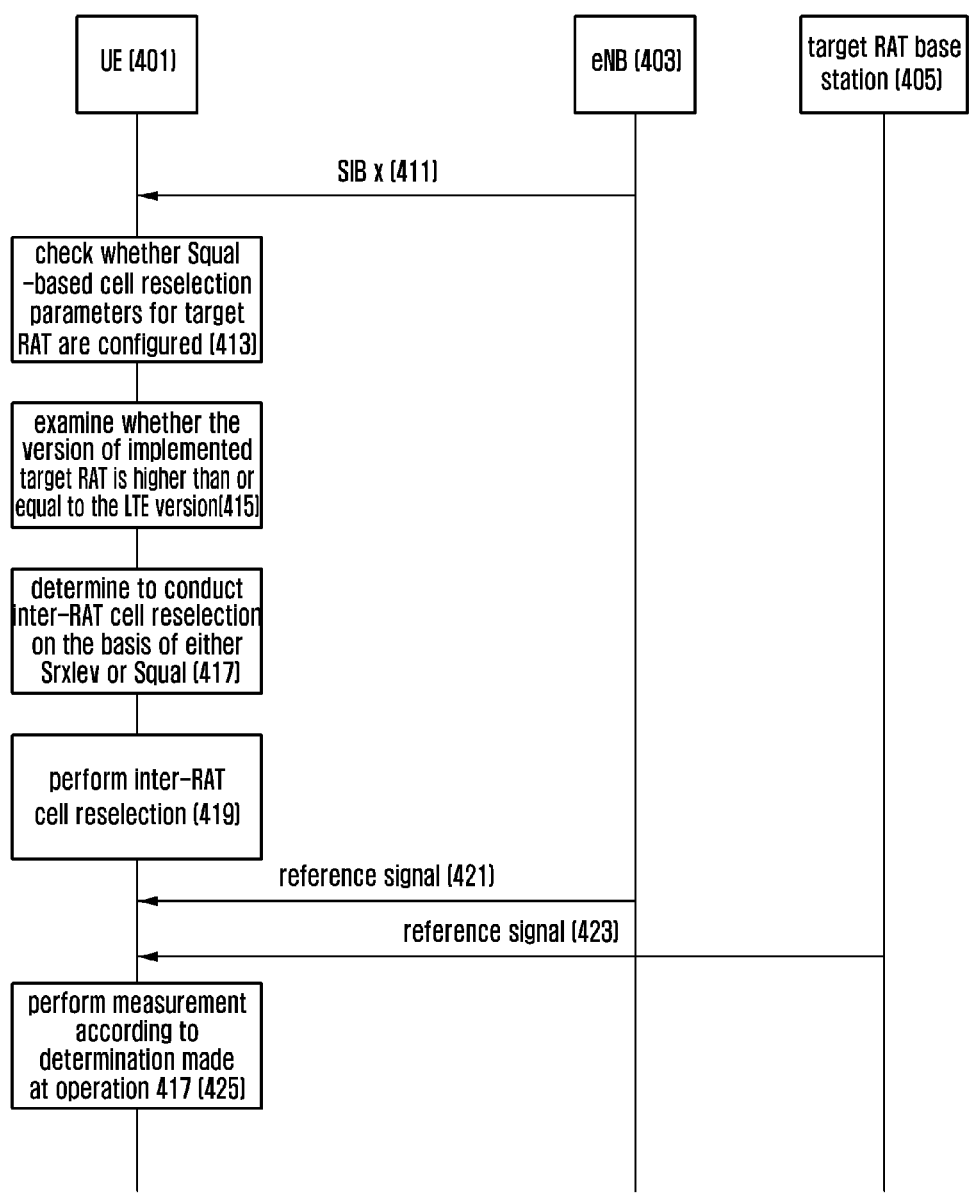
FIG. 4 illustrates a first embodiment of inter-RAT cell reselection for a user equipment in the LTE system according to the present disclosure.

FIG. 4 is a sequence diagram illustrating a first embodiment of inter-RAT cell reselection for a user equipment in the LTE system according to the present disclosure.

In FIG. 4, it is assumed that the UE 401 is a terminal of a latest version (e.g. Rel-9), supports Squal-based measurement, and remains in an ENB 403 after cell selection. Namely, the UE remains in the idle mode at an LTE base station.

The UE may receive preset System Information Blocks (SIBs) from the base station. Specifically, for cell selection/reselection to a neighboring base station employing a different RAT (e.g. GSM or UMTS base station), at operation 411, the UE receives a SIB containing corresponding cell selection/reselection parameters.

Upon SIB reception, at operation 413, the UE checks whether Squal-based cell reselection parameters for a target RAT (e.g. $Thresh_{X,HighQ}$ value or corresponding value) are contained in the received SIB. As described before, among cell reselection parameters, UMTS-related parameters may be obtained from SIB6 and GSM-related parameters may be obtained from SIB7.

If Squal-based cell reselection parameters are not contained in the received SIB, at operation 417, the UE determines to conduct cell reselection based on Srxlev measurement results.

If Squal-based cell reselection parameters are contained in the received SIB, at operation 415, the UE examines the version of the target RAT implemented internally to the UE.

If the version of the target RAT implemented internally is lower than the LTE version (or the mobile communication system version) of the UE (e.g. Rel-8 or lower), at operation 417, the UE determines to conduct cell reselection to the target RAT on the basis of Srxlev measurement results. If the version of the target RAT implemented internally is higher than or equal to the LTE version of the UE, at operation 417, the UE determines to conduct cell reselection to the target RAT on the basis of Squal measurement results. Examination of the version of a target RAT implemented internally to the UE is performed because, when the LTE version of the UE supports cell reselection based on Squal measurement results, inter-RAT cell reselection based on Squal measurement results can also be supported by the target RAT if the target RAT version is higher than or equal to the LTE version of the UE.

Upon determining to conduct inter-RAT cell reselection based on either Srxlev or Squal, at operation 419, the UE performs inter-RAT cell reselection accordingly. At operations 421 and 423, the UE receives reference signals from the target RATs. At operation 425, the UE performs measurement according to the determination made at operation 417.

Figure 5:
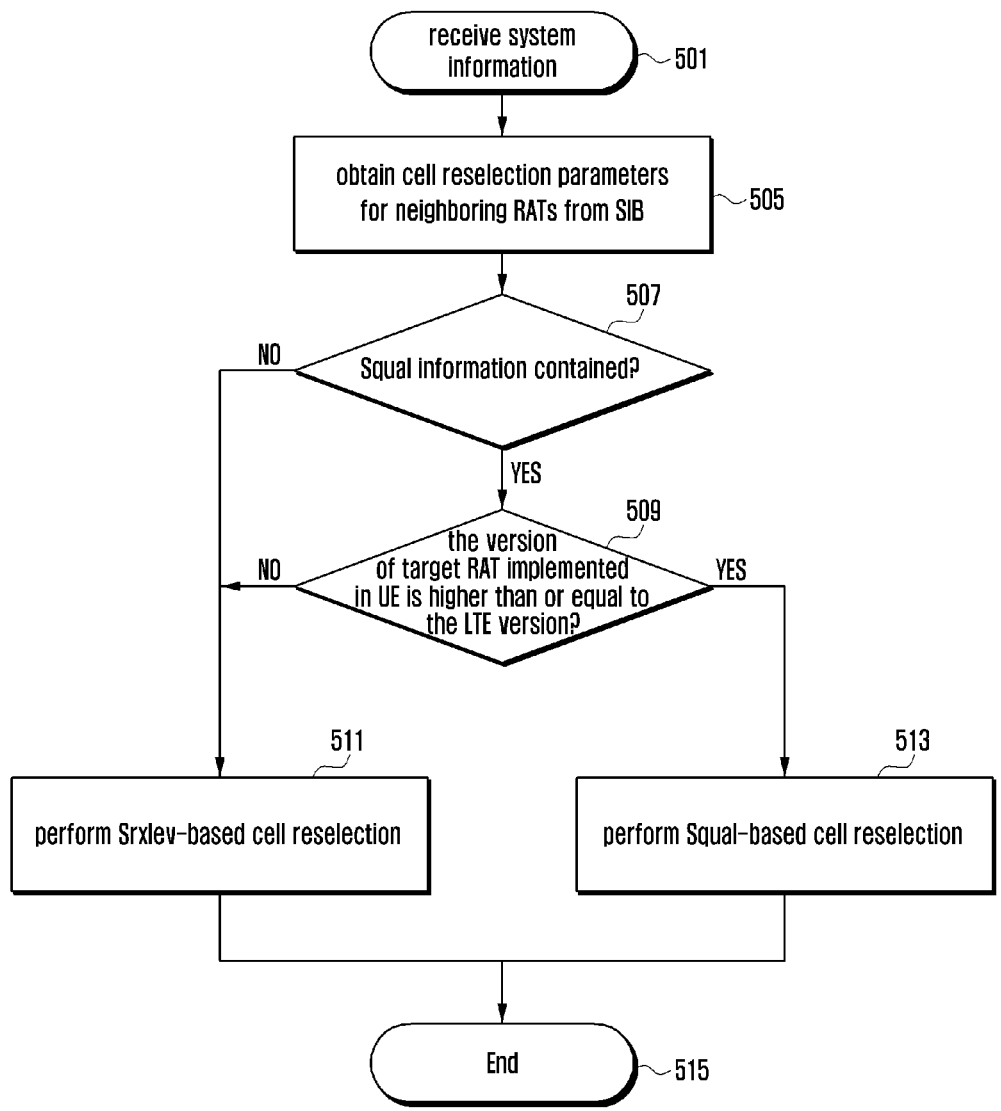
FIG. 5 is a flowchart illustrating operations of the user equipment using the first embodiment of inter-RAT cell reselection in the LTE system.

FIG. 5 is a flowchart illustrating operations of a user equipment using the first embodiment of inter-RAT cell reselection in the LTE system.

At operation 501, the UE receives preset SIBs from the LTE base station. At operation 505, the UE obtains cell reselection parameters for a neighboring target RAT from the SIBs.

At operation 507, the UE checks whether Squal-based parameters are contained in the cell reselection parameters for a neighboring target RAT. If Squal-based parameters are not contained in the SIB, the UE proceeds to operation 511 at which the UE performs cell reselection based on Srxlev.

If Squal-based parameters are contained in the SIB, the UE proceeds to operation 509 at which the UE checks whether the version of the target RAT implemented internally to the UE is higher than or equal to the implemented LTE version of the UE.

If the version of the target RAT implemented internally is lower than the LTE version of the UE (e.g. Rel-8 or lower), the UE proceeds to operation 511 at which the UE performs cell reselection based on Srxlev.

If the version of the target RAT implemented internally is higher than or equal to the LTE version of the UE, the UE proceeds to operation 513 at which the UE performs cell reselection based on Squal.

Examination of the version of a target RAT implemented internally to the UE is performed because, when the LTE version of the UE supports Squal, Squal-based measurement can also be supported by the target RAT if the target RAT version is higher than or equal to the LTE version of the UE.

Figure 6:
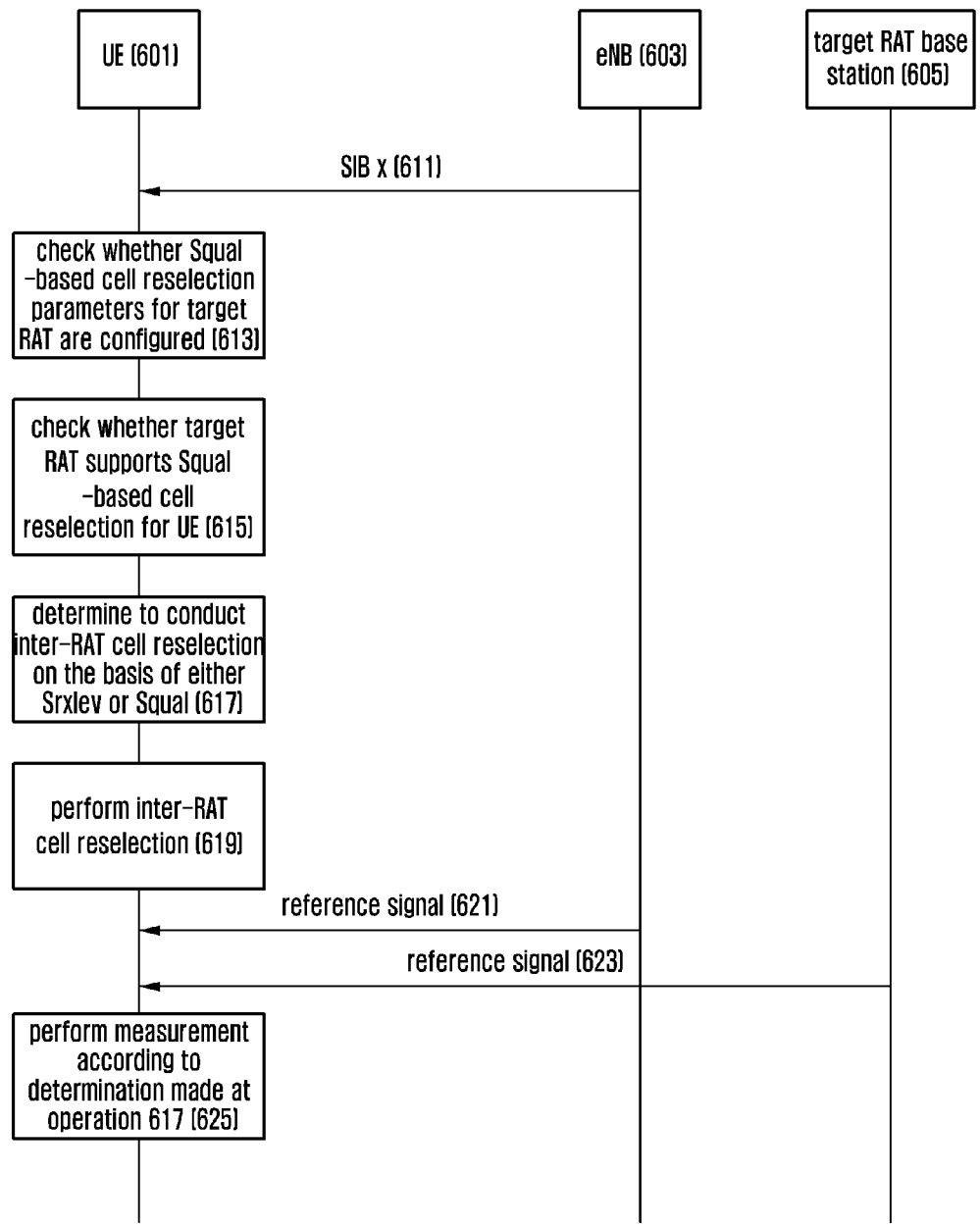
FIG. 6 illustrates a second embodiment of inter-RAT cell reselection for a user equipment in the LTE system according to the present disclosure.

FIG. 6 is a sequence diagram illustrating a second embodiment of inter-RAT cell reselection for a user equipment in the LTE system according to the present disclosure. In FIG. 6, it is assumed that the UE 601 is a terminal of the latest version (e.g. Rel-9), supports cell reselection based on Squal measurement results, and remains in an ENB 603 after cell selection. Namely, the UE remains in the idle mode at an LTE base station.

At operation 611, the UE receives a preset SIB from the LTE base station. At operation 613, the UE checks whether Squal-based cell reselection parameters for a target RAT are configured.

If Squal-based cell reselection parameters for a target RAT are configured, at operation 615, the UE checks whether the target RAT to be reselected (e.g. GSM or UMTS) supports Squal-based cell reselection. For example, when UMTS is selected by the UE as a target RAT, the UE checks whether it is possible to conduct Squal-based inter-RAT cell reselection from the UMTS cell to the LTE cell.

If the target RAT does not support Squal-based cell reselection, at operation 617, the UE determines to conduct Srxlev-based cell reselection. If the target RAT supports Squal-based cell reselection, at operation 617, the UE determines to conduct Squal-based cell reselection under assumption that it is possible to conduct Squal-based cell reselection at the target RAT cell after cell reselection to the target RAT cell.

Upon determining to conduct inter-RAT cell reselection based on either Srxlev or Squal, at operation 619, the UE performs inter-RAT cell reselection accordingly. At operations 621 and 623, the UE receives reference signals from the target RATs. At operation 625, the UE performs measurement according to the determination made at operation 617.

Figure 7:
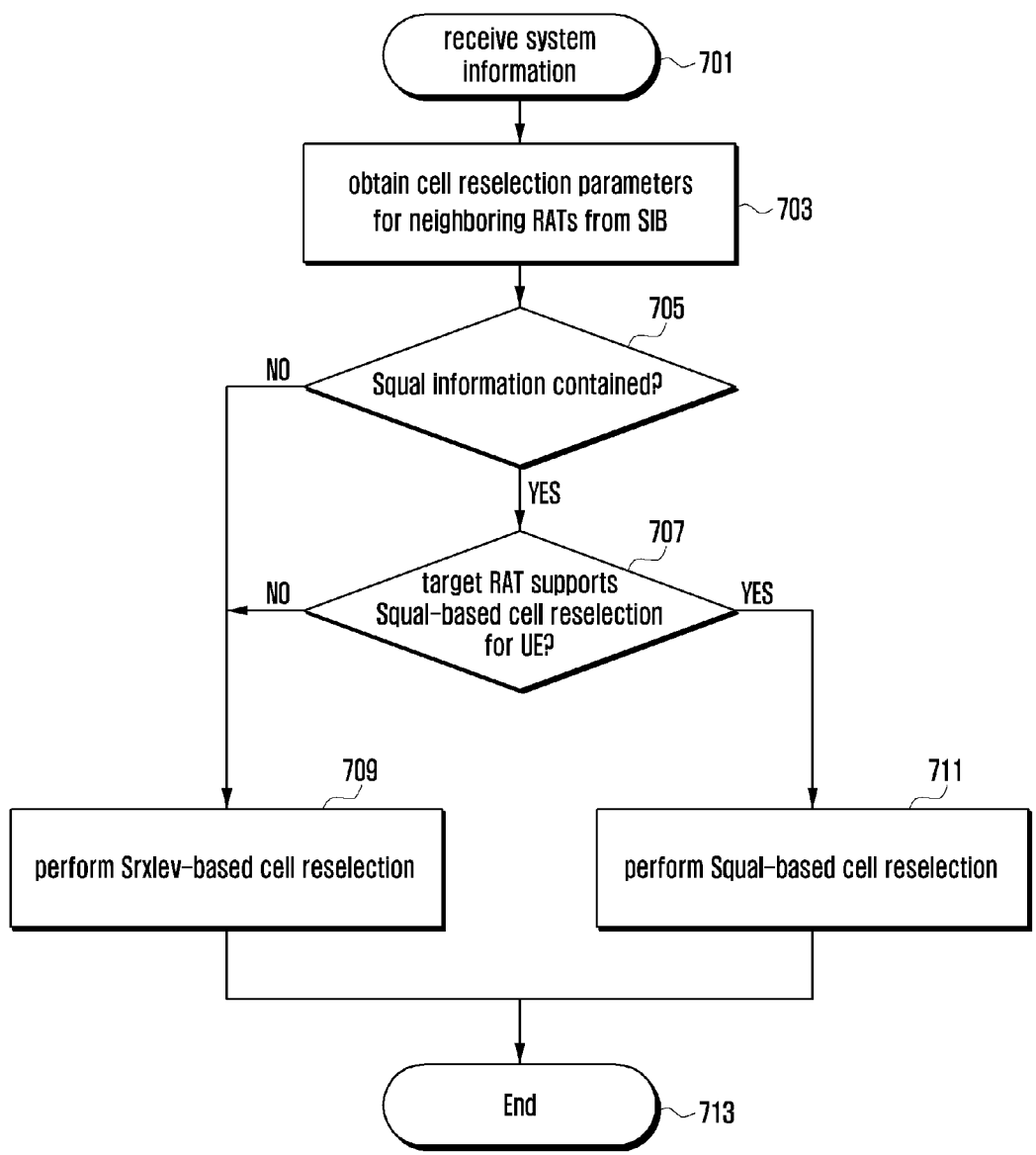
FIG. 7 is a flowchart illustrating operations of the user equipment using the second embodiment of inter-RAT cell reselection in the LTE system.

FIG. 7 is a flowchart illustrating operations of the user equipment using the second embodiment of inter-RAT cell reselection in the LTE system.

At operation 701, the UE in the idle mode at an LTE cell receives preset SIBs from the LTE base station. At operation 703, the UE obtains cell reselection parameters for a neighboring target RAT from the SIBs.

At operation 705, the UE checks whether Squal-based parameters are contained in the cell reselection parameters for a neighboring target RAT. If Squal-based parameters are not contained in the SIB, the UE proceeds to operation 709 at which the UE performs cell reselection based on Srxlev.

If Squal-based parameters are contained in the SIB, the UE proceeds to operation 707 at which the UE checks whether the target RAT supports Squal-based cell reselection. For example, when UMTS is selected by the UE as a target RAT, the UE checks whether it is possible to conduct Squal-based inter-RAT cell reselection from the UMTS cell to the LTE cell. If the target RAT does not support Squal-based cell reselection, the UE proceeds to operation 709 at which the UE determines to conduct Srxlev-based cell reselection.

If the target RAT supports Squal-based cell reselection, the UE proceeds to operation 711 at which the UE determines to conduct Squal-based cell reselection under assumption that it is possible to conduct Squal-based cell reselection at the target RAT cell after cell reselection to the target RAT cell.

Figure 8:
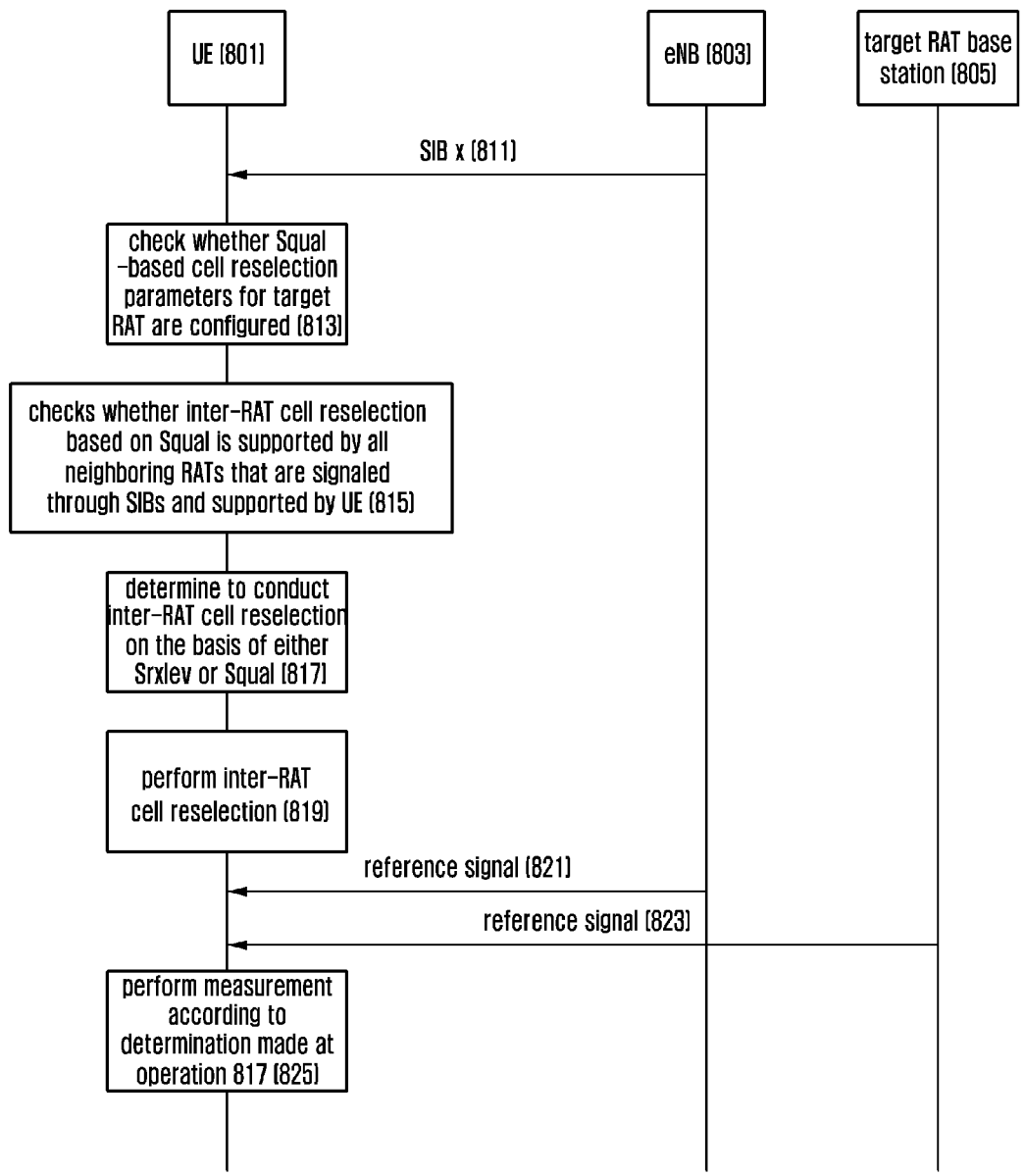
FIG. 8 illustrates a third embodiment of inter-RAT cell reselection for a user equipment in the LTE system according to the present disclosure.

FIG. 8 illustrates a third embodiment of inter-RAT cell reselection for a user equipment in the LTE system according to the present disclosure.

FIG. 8 is a sequence diagram illustrating a third embodiment of inter-RAT cell reselection for a user equipment in the LTE system according to the present disclosure.

In FIG. 8, it is assumed that the UE 801 is a terminal of the latest version (e.g. Rel-9), supports cell reselection based on Squal measurement results, and remains in an ENB 803 after cell selection. Namely, the UE remains in the idle mode at an LTE base station.

At operation 811, the UE receives preset SIBs from the base station and obtains cell selection/reselection parameters for neighboring base stations employing different RATs (e.g. GSM and UMTS base stations).

At operation 813, the UE checks whether cell reselection parameters based on Squal measurement results are contained as cell reselection information for a neighboring RAT in a designated SIB.

If cell reselection parameters based on Squal measurement results are not contained as cell reselection information for a neighboring RAT in a designated SIB, at operation 817, the UE determines to conduct cell reselection to the RAT based on Srxlev measurement results.

If cell reselection parameters based on Squal measurement results are contained as cell reselection information for a neighboring RAT in a designated SIB, at operation 815, the UE checks whether inter-RAT cell reselection based on Squal measurement results is supported by all neighboring RATs that are signaled through designated SIBs and supported by the UE. That is, whether all neighboring RATs support cell reselection based on Squal measurement results for the UE is examined.

If one of the neighboring RATs signaled through the designated SIBs among all other RATs supported by the UE does not support inter-RAT cell reselection based on Squal measurement results, at operation 817, the UE determines to conduct cell reselection to the corresponding RAT (the RAT whose cell reselection information is configured in the designated SIB) based on Srxlev measurement results.

If all the neighboring RATs signaled through the designated SIBs among all other RATs supported by the UE support inter-RAT cell reselection based on Squal measurement results, at operation 817, the UE determines to conduct cell reselection to the corresponding RAT (the RAT whose cell reselection information is configured in the designated SIB) based on Squal measurement results. For example, if any of neighboring RATs does not support Squal-based cell reselection, the UE does not perform cell reselection to a different RAT supporting Squal-based cell reselection.

Upon determining to conduct inter-RAT cell reselection based on either Srxlev or Squal, at operation 819, the UE performs inter-RAT cell reselection accordingly. At operations 821 and 823, the UE receives reference signals from the target RAT base stations. At operation 825, the UE performs measurement according to the determination made at operation 817.

An example for the above scheme is described. It is assumed that the UE supports LTE, UMTS, GSM and CDMA2000 RATs. It is also assumed that cell reselection parameters based on Squal measurement results are configured as cell reselection information for neighboring UMTS in a designated SIB. The UE identifies cell reselection information for neighboring RATs through designated SIBs. When cell reselection parameters for UMTS and GSM only are configured as neighboring system information in the designated SIBs, the UE regards CDMA2000 as a non-neighboring RAT and does not consider CDMA2000 for reselection. Hence, among RATs supported by the UE, neighboring RATs signaled through designated SIBs are GSM and UMTS. Only if the UE supports inter-RAT cell reselection based on Squal measurement results at both GSM and UMTS (e.g. cell reselection to LTE), the UE performs inter-RAT cell reselection based on Squal measurement results to UMTS (the neighboring RAT whose cell reselection information is configured based on Squal measurement results in the designated SIB). That is, the UE performs Squal-based cell reselection only when the UE supports Squal-based measurement at both GSM and UMTS for cell reselection to LTE. If the UE does not support Squal-based cell reselection from GSM to LTE, although the UE supports Squal-based cell reselection from UMTS to LTE, the UE performs Srxlev-based cell reselection to UMTS (the neighboring RAT whose cell reselection information is configured based on Squal measurement results in the designated SIB).

Figure 9:
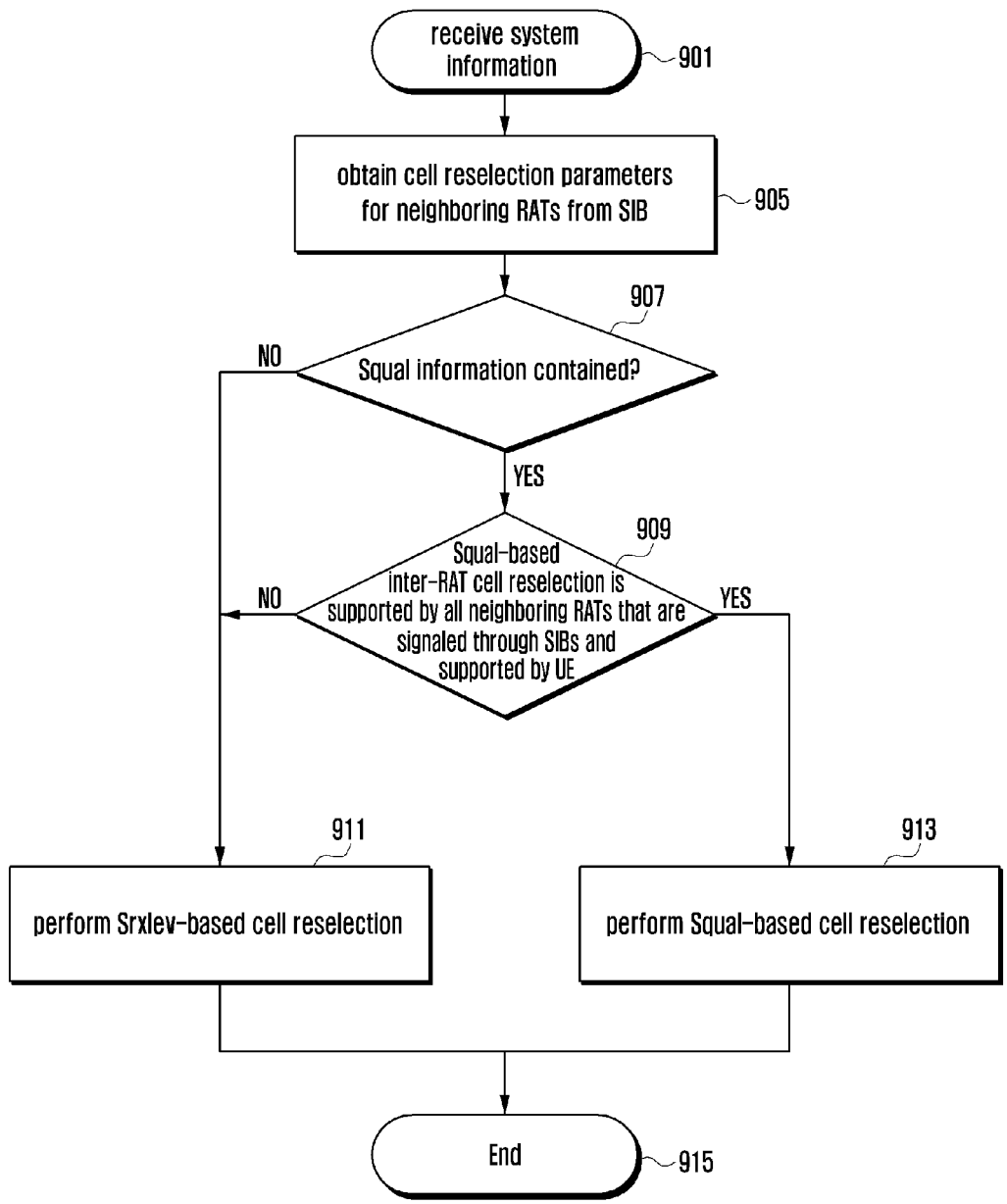
FIG. 9 is a flowchart illustrating operations of the user equipment using the third embodiment of inter-RAT cell reselection in the LTE system.

FIG. 9 is a flowchart illustrating operations of the user equipment using the third embodiment of inter-RAT cell reselection in the LTE system.

At operation 901, the UE in the idle mode at an LTE cell receives designated SIBs from the LTE base station.

At operation 905, the UE obtains cell reselection parameters for a neighboring target RAT from the SIBs. At operation 907, the UE checks whether Squal measurement-based parameters are contained in the cell reselection parameters for a neighboring target RAT. If cell reselection parameters based on Squal measurement results are not configured in the SIB, the UE proceeds to operation 911 at which the UE performs cell reselection to the target RAT on the basis of Srxlev measurement results.

If cell reselection parameters based on Squal measurement results are configured in the SIB, the UE proceeds to operation 909 at which the UE checks whether inter-RAT cell reselection based on Squal measurement results is supported by all neighboring RATs that are signaled through designated SIBs and supported by the UE.

If one of the neighboring RATs signaled through the designated SIBs among all other RATs supported by the UE does not support inter-RAT cell reselection based on Squal measurement results (i.e. if any of the neighboring RATs does not support cell reselection based on Squal measurement results), the UE proceeds to operation 911 at which the UE conducts cell reselection to the corresponding RAT (the RAT whose cell reselection information is configured based on Squal measurement results in the designated SIB) based on Srxlev measurement results.

If all the neighboring RATs signaled through the designated SIBs among all other RATs supported by the UE support inter-RAT cell reselection based on Squal measurement results, the UE proceeds to operation 913 at which the UE conducts cell reselection to the corresponding RAT (the RAT whose cell reselection information is configured based on Squal measurement results in the designated SIB) based on Squal measurement results.

An example for the above scheme is described. It is assumed that the UE supports LTE, UMTS, GSM and CDMA2000 RATs. It is also assumed that cell reselection parameters based on Squal measurement results are configured as cell reselection information for neighboring UMTS in a designated SIB (operations 905 and 907). The UE identifies cell reselection information for neighboring RATs through designated SIBs. When cell reselection parameters for UMTS and GSM only are configured as neighboring system information in the designated SIBs, the UE regards CDMA2000 as a non-neighboring RAT and does not consider CDMA2000 for reselection. Hence, among RATs supported by the UE, neighboring RATs signaled through designated SIBs are GSM and UMTS. Only if the UE supports inter-RAT cell reselection based on Squal measurement results at both GSM and UMTS (e.g. cell reselection from GSM and UMTS to LTE) (operation 909), the UE performs inter-RAT cell reselection to UMTS (the neighboring RAT whose cell reselection information is configured based on Squal measurement results in the designated SIB) on the basis of Squal measurement results (operation 913). That is, the UE performs Squal-based cell reselection only when the UE supports Squal-based measurement at both GSM and UMTS for cell reselection to LTE. If the UE does not support Squal-based cell reselection from GSM to LTE (operation 909), although the UE supports Squal-based cell reselection from UMTS to LTE, the UE performs Srxlev-based cell reselection to UMTS (the neighboring RAT whose cell reselection information is configured based on Squal measurement results in the designated SIB) (operation 911).

Figure 10:
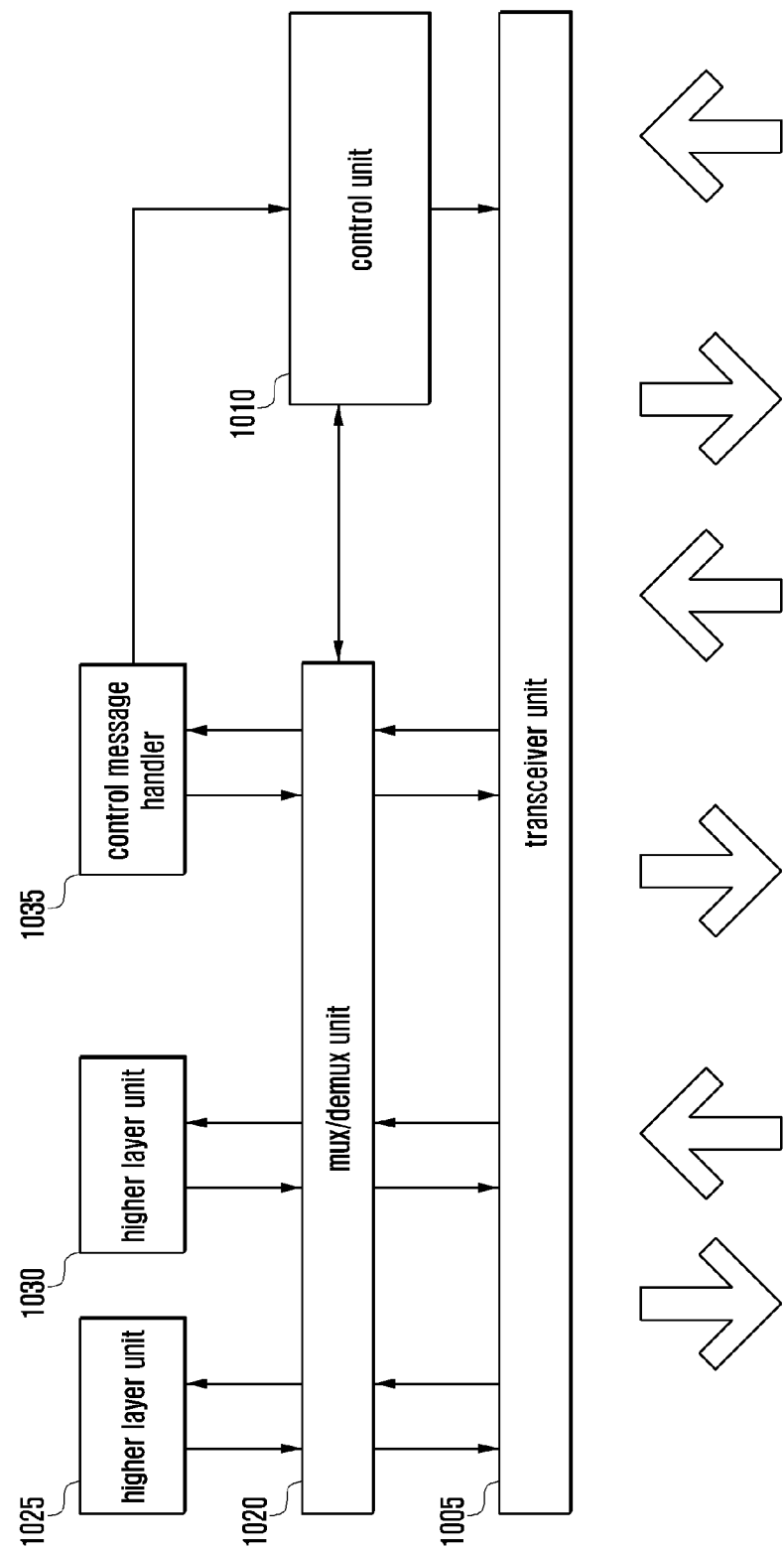
FIG. 10 is a block diagram of a user equipment according to an embodiment of the present disclosure.

FIG. 10 is a block diagram of a user equipment according to an embodiment of the present disclosure.

Referring to FIG. 10, the user equipment may include a transceiver unit 1005, a control unit 1010, a mux/demux unit 1015, a control message handler 1030, and various higher layer units 1020 and 1025.

The transceiver unit 1005 receives data and control signals through downlink channels of a serving cell and sends data and control signals through uplink channels. When multiple serving cells are configured, the transceiver unit 1005 may send and receive data and control signals through the multiple serving cells.

The mux/demux unit 1015 multiplexes data coming from the higher layer units 1020 and 1025 or the control message handler 1030, and demultiplexes data received by the transceiver unit 1005 and forwards the demultiplexed data to the higher layer units 1020 and 1025 or the control message handler 1030.

The control message handler 1030 processes a control message received from a base station and performs a corresponding operation. For example, when DRX related parameters are received, the control message handler 1030 forwards the same to the control unit 1010.

The higher layer units 1020 and 1025 may be configured on a service basis. The higher layer units 1020 and 1025 may process user data generated by service applications such as File Transfer Protocol (FTP) and Voice over Internet Protocol (VoIP) and forward the processed user data to the mux/demux unit 1015, and delivers data coming from the mux/demux unit 1015 to appropriate service applications at the higher layer.

The control unit 1010 examines scheduling commands such as UL grants received through the transceiver unit 1005, and controls the transceiver unit 1005 and the mux/demux unit 1015 so that uplink transmissions are performed at proper points in time with appropriate transmission resources. The control unit 1010 controls the transceiver unit 1005 for DRX operation and CSI/SRS transmission.

Particularly, in various embodiments of the present disclosure, the control unit 1010 receives a SIB containing cell reselection parameters from a corresponding base station, and examines whether Squal-based cell reselection parameters are configured in the received SIB. If Squal-based cell reselection parameters are not configured, the control unit 1010 controls an operation to perform Srxlev-based cell reselection.

In the first embodiment, if Squal-based cell reselection parameters are configured, the control unit 1010 examines the version of a target RAT to be reselected (or a target mobile communication system) implemented internally to the UE. The control unit 1010 compares the version of the target RAT implemented internally with the version of a preset RAT of the UE. If the version of the target RAT implemented internally is higher than or equal to the version of the preset RAT of the UE, the control unit 1010 may control an operation to conduct cell reselection based on Squal measurement results. If the version of the target RAT implemented internally is lower than the version of the preset RAT of the UE, the control unit 1010 may control an operation to conduct cell reselection based on Srxlev.

In the second embodiment, if Squal-based cell reselection parameters are configured, the control unit 1010 checks whether a target RAT to be reselected (or a target mobile communication system) supports cell reselection based on Squal measurement results. If the target RAT supports Squal-based cell reselection, the control unit 1010 may control an operation to perform cell reselection based on Squal measurement results. If the target RAT does not support Squal-based cell reselection, the control unit 1010 may control an operation to perform Srxlev-based cell reselection.

In the third embodiment, if Squal-based cell reselection parameters are configured, the control unit 1010 checks whether inter-RAT cell reselection based on Squal measurement results is supported by all neighboring RATs (or neighboring mobile communication systems) that are signaled through designated SIBs and supported by the UE. If all the neighboring RATs support inter-RAT cell reselection based on Squal measurement results, the control unit 1010 may control an operation to conduct cell reselection based on Squal measurement results. If any of the neighboring RATs does not support inter-RAT cell reselection based on Squal measurement results, the control unit 1010 may control an operation to conduct Srxlev-based cell reselection.

Figure 11:
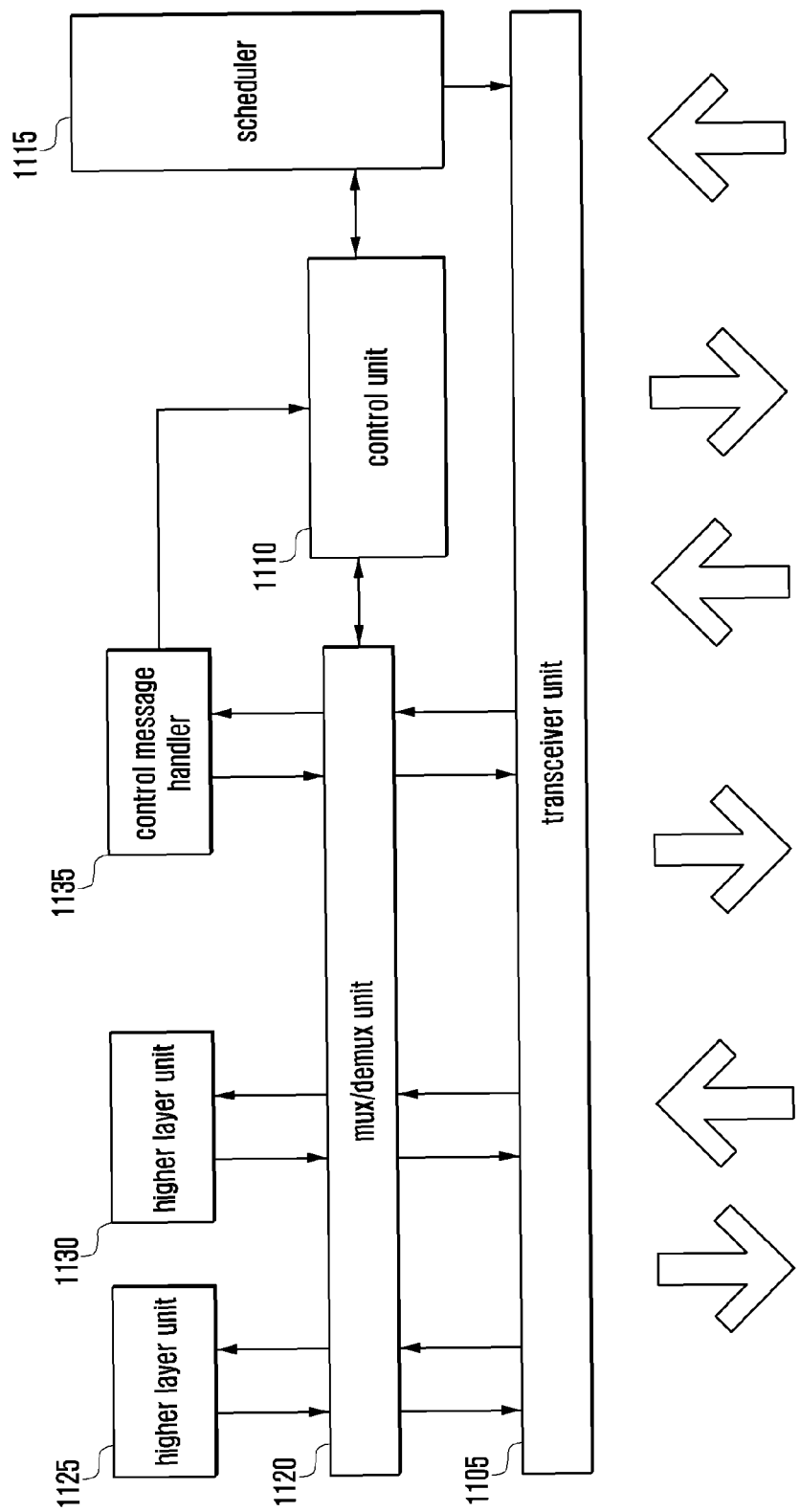
FIG. 11 is a block diagram of a base station according to an embodiment of the present disclosure.

FIG. 11 is a block diagram of a base station according to an embodiment of the present disclosure. The base station of FIG. 11 may include a transceiver unit 1105, a control unit 1110, a mux/demux unit 1120, a control message handler 1135, various higher layer units 1125 and 1130, and a scheduler 1115.

The transceiver unit 1105 sends data and control signals through a downlink carrier and receives data and control signals through an uplink carrier. When multiple carriers are configured, the transceiver unit 1105 may send and receive data and control signals through the multiple carriers.

The mux/demux unit 1120 multiplexes data coming from the higher layer units 1125 and 1130 or the control message handler 1135, and demultiplexes data received by the transceiver unit 1105 and forwards the demultiplexed data to the higher layer units 1125 and 1130, the control message handler 1135 or the control unit 1110. The control message handler 1135 processes a control message received from a user equipment and performs a corresponding operation, and generates a control message to be sent to a user equipment and forwards the control message to a lower layer.

The higher layer units 1125 and 1130 may be configured on a terminal and service basis. The higher layer units 1125 and 1130 may process user data generated by service applications such as FTP and VoIP and forward the processed user data to the mux/demux unit 1120, and process data coming from the mux/demux unit 1120 and deliver the processed data to service applications at the higher layer.

The control unit 1110 determines CSI/SRS transmission times of user equipments and controls the transceiver unit 1105 accordingly.

The scheduler 1115 allocates transmission resources to a user equipment at appropriate points in time in consideration of buffer states, channel states and active time of the user equipment, and controls the transceiver unit 1105 to send or receive a signal to or from the user equipment.

Use of the proposed method enables sensible reselection of a cell without unnecessary cell reselection in a network wherein heterogeneous radio access technologies coexist with each other.

While the present disclosure has been shown and described with reference to various embodiments thereof, it should be understood by those skilled in the art that many variations and modifications of the method and apparatus described herein will still fall within the spirit and scope of the present disclosure as defined in the appended claims and their equivalents.

The invention claimed is:

1. A method for inter radio access technology (RAT) cell reselection by a terminal in a wireless communication system, the method comprising:
receiving, from a base station, system information including information for inter RAT cell reselection;
determining whether the system information includes a quality value for cell reselection;
determining whether a terminal supports a quality value based cell reselection if the system information includes the quality value for the cell reselection;
performing a first cell reselection based on the quality value if the terminal supports the quality value based on the cell reselection; and
performing a second cell reselection based on a reception level value if the terminal does not support the quality value based cell reselection.

2. The method of claim 1, further comprising performing the second cell reselection based on the reception level value if the system information does not include the quality value for the cell reselection.

3. The method of claim 1, wherein the quality value for the cell reselection is received though a system information block (SIB) 6 or SIB 7.

4. The method of claim 1, wherein a RAT associated with the inter RAT cell reselection includes long term evolution (LTE), universal mobile telecommunications system (UMTS), global system for mobile communication (GSM), or code division multiple access (CDMA) 2000.

5. The method of claim 1, wherein the determining of whether the terminal supports the quality value based cell reselection comprises:
determining a mobile communication system version implemented at the terminal,
determining a mobile communication system version implemented at a target RAT based on the system information, and
determining that the terminal supports the quality value based cell reselection if the system information includes the quality value for the inter RAT cell reselection and the mobile communication system version implemented at the terminal is greater than or equal to the mobile communication system version implemented at the target RAT.

6. A terminal for performing cell reselection, the terminal comprising:
a transceiver configured to transmit and receive a signal; and
at least one processor configured to:
control the transceiver to receive, from a base station, system information including information for inter radio access technology (RAT) cell reselection,
determine whether the system information includes a quality value for cell reselection, determine whether a terminal supports a quality value based cell reselection if the system information includes the quality value for the cell reselection, perform a first cell reselection based on the quality value if the terminal supports the quality value based cell reselection, and perform a second cell reselection based on a reception level value if the terminal does not support the quality value based cell reselection.

7. The terminal of claim 6, wherein the at least one processor is further configured to perform the second cell reselection based on the reception level if the system information does not include the quality value for the cell reselection.

8. The terminal of claim 6, wherein the quality value for the cell reselection is received though a system information block (SIB) 6 or SIB 7.

9. The terminal of claim 6, wherein a RAT associated with the inter RAT cell reselection includes long term evolution (LTE), universal mobile telecommunications system (UMTS), global system for mobile communication (GSM) or code division multiple access (CDMA) 2000.

10. The terminal of claim 6, wherein the at least one processor is further configured to:

determine a mobile communication system version implemented at the terminal, and determine a mobile communication system version implemented at a target RAT based on the system information, wherein it is determined that the terminal supports the quality value based cell reselection if the system information includes the quality value for the inter RAT cell reselection and the mobile communication system version implemented at the terminal is greater than or equal to the mobile communication system version implemented at the target RAT.

* * * * *